(12) United States Patent
Harsham et al.

(10) Patent No.: US 9,159,317 B2
(45) Date of Patent: Oct. 13, 2015

(54) SYSTEM AND METHOD FOR RECOGNIZING SPEECH

(71) Applicant: Mitsubishi Electric Research Laboratories, Inc., Cambridge, MA (US)

(72) Inventors: Bret Harsham, Newton, MA (US); John R. Hershey, Winchester, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 155 days.

(21) Appl. No.: 13/917,884

(22) Filed: Jun. 14, 2013

(65) Prior Publication Data

US 2014/0372120 A1    Dec. 18, 2014

(51) Int. Cl.
*G10L 15/04*   (2013.01)
*G10L 15/08*   (2006.01)
*G10L 15/22*   (2006.01)
*G10L 15/183*  (2013.01)

(52) U.S. Cl.
CPC .............. *G10L 15/08* (2013.01); *G10L 15/183* (2013.01); *G10L 15/22* (2013.01); *G10L 2015/088* (2013.01); *G10L 2015/228* (2013.01)

(58) Field of Classification Search
CPC ....... G10L 15/06; G10L 15/193; G10L 15/22; G10L 15/265; G10L 15/32; G10L 15/00; G10L 15/14; G10L 15/197; G10L 15/30; G10L 15/28; G10L 15/18; G10L 15/20; G10L 15/005; G10L 15/083; G10L 15/16; G10L 17/06

USPC ......... 704/251, 255, 257, 236, 243, 275, 246, 704/1–10, 252, 239, 240, 235
See application file for complete search history.

(56) References Cited

U.S. PATENT DOCUMENTS

| | | | |
|---|---|---|---|
| 5,606,644 A * | 2/1997 | Chou et al. ................... | 704/243 |
| 5,712,957 A | 1/1998 | Waibel et al. | |
| 5,960,447 A | 9/1999 | Holt | |
| 5,970,460 A | 10/1999 | Bunce | |
| 6,064,959 A | 5/2000 | Young | |
| 6,456,972 B1 * | 9/2002 | Gladstein et al. ............. | 704/257 |
| 7,444,286 B2 | 10/2008 | Roth | |
| 7,529,678 B2 * | 5/2009 | Kobal ............................ | 704/275 |
| 2005/0187768 A1 | 8/2005 | Godden et al. | |
| 2006/0293889 A1 | 12/2006 | Kiss | |
| 2008/0114595 A1 * | 5/2008 | Vair et al. ...................... | 704/236 |
| 2009/0150156 A1 | 6/2009 | Kennewick et al. | |
| 2014/0081636 A1 * | 3/2014 | Erhart et al. .................. | 704/236 |
| 2014/0214424 A1 * | 7/2014 | Wang et al. ................... | 704/246 |

* cited by examiner

*Primary Examiner* — Huyen Vo
(74) *Attorney, Agent, or Firm* — Dirk Brinkman; Gene Vinokur

(57) ABSTRACT

A system and a method recognize speech including a sequence of words. A set of interpretations of the speech is generated using an acoustic model and a language model, and, for each interpretation, a score representing correctness of an interpretation in representing the sequence of words is determined to produce a set of scores. Next, the set of scores is updated based on a consistency of each interpretation with a constraint determined in response to receiving a word sequence constraint.

18 Claims, 12 Drawing Sheets

SYSTEM AND METHOD FOR RECOGNIZING SPEECH

FIELD OF THE INVENTION

The present invention relates generally to automatic speech recognition, and more particularly to providing the speech recognition while placing low cognitive load on a user.

BACKGROUND OF THE INVENTION

It is generally known that any non-driving-related task performed by a driver can be a distraction from driving. Because of this, there has been a recent focus on reducing the use of mobile telephones while driving, both by legislative means and by driver education. There has also been an increasing demand for driver access to information, communication; and entertainment functions in the vehicle.

Studies have shown that speech-based interfaces can be less distracting than conventional visual or manual interfaces. Command-based speech interfaces for limited functions are becoming common in vehicles. However, text entry using speech for such functions as SMS is difficult because recognition of a large-vocabulary continuous speech is prone to errors. Thus, there is a need fix correcting or otherwise changing text that has been input using speech while reducing distraction on the part of a user while driving.

Some methods for correcting unrestricted speech utilize editing applications, i.e., word processors with computer displays and conventional keyboards. For example, the method, described in U.S. Pat. No. 5,960,447, corrects misrecognitions of speech by tagging words in the recognized text with associated speech and allowing users of word processing software to listen to the speech for editing text transcriptions.

Another method, described in U.S. Pat. No. 5,970,460 improves editing operations by associating a "speech event database" with positions in a text transcription in an editing application program and widening the context. Such methods require primary attention to the correction task including conventional keyboard, mice, and menu selection and, particularly, drawing upon visual resources necessary to attend to visual displays. However, the use of keyboards, touch-screen, and large visual displays do not minimize distractions from driving.

Other methods minimize complexity of interaction by using subsequent speech to edit the transcription resulting from a first speech. For example, a method described in U.S. Pat. No. 6,064,959 corrects result of the speech recognition using the subsequent utterance. Similarly, the method described in U.S. Pat. No. 7,444,286 selects portions of the speech recognition to be re-recognized. However, the subsequent interpretation of the Speech can produce errors, resulting in increased the error correction efforts, and further contributing to driver distraction.

Another method described in U.S. 2006/293,889 uses corrections of a single word given by the user to adjust the alternative suggestions for words adjacent to that single word. However, if multiple words in the speech of the user are interpreted incorrectly, the user has to correct the speech interpretation multiple times. Moreover, the corrections of this method are limited to replacement of the selected word, as opposed to more general types of interactions, which may lead to further distractions for the user. Therefore there is a need to minimize the interactions and user attention necessary to guide the interpretation of speech.

SUMMARY OF THE INVENTION

Some embodiments of the invention are based on a realization that errors that occur in speech recognition of large-vocabulary continuous speech including a sequence of words are often associated with other errors. Therefore a correction to the recognition result can be used to predict where other errors might have occurred and to correct the additional errors, instead of just correcting the initial error and waiting for additional user input. These other errors may occur in adjacent word locations, or they may occur in more distant locations without any changes needed to adjacent words, thus the correction should be used to update the recognition result.

For example, a recognition result in a navigation point-of-interest task might include the two alternate word sequences "Museum of Fine Arts" and "Emporium of Fine Carts". In this case, if the original interpretation is "Museum of Fine Arts", and a user changes "Arts" to "Carts", then it is probable that the word "Museum" should be changed to "Emporium" even though there are several words in between whose interpretation does not change.

In addition, some embodiments of the invention are based on a general realization that corrections to an interpretation of speech recognition of large-vocabulary continuous speech do not need to be restricted to changing one possible word to another, but can also include more general kinds of correction constraints. The correction constraint can then be used to re-interpret the speech uttered by a user.

Such constraints can improve the probability of correctly interpreting group of words, as contrasted with an interpretation that only uses the acoustic signals corresponding to the individual words.

For example, given a recognition result including alternates "Wreck a nice beach" and "Recognize speech", a constraint that the topic is "pollution" can be used to update the probabilities of the first recognition.

Accordingly, some embodiments are based on a specific realization, that reinterpreting the entire speech can be improved by using constraints on the word sequence of the speech provided, e.g., by a user uttering the speech. For example, the word sequence constraints can include a number and order of the words in the speech, a specific word uttered at specific time in the speech, the absence of the specific word in the speech, a connection or separation of two specific words in the speech.

For example, instead of asking the user to correct a specific word or words of the interpretation of the speech, an input from the user can be used to determine the word sequence constraints, which can be used to update the entire interpretation of the speech. This realization allows reducing an effort of the user to correct the speech, because the word sequence constraints can lead to the correction of the entire interpretation of the speech, while the correction of the word can lead to the correction of that word only.

Thus, some embodiments of the invention use word sequence constraints provided by the user for updating the interpretation of the speech of the user. For example, the best-scoring hypothesis of the entire speech can be determined subject to word-sequence constraints. In effect, such approach can minimize a number of interactions required to determine correct interpretation of the speech sequence.

Various embodiments determine the word-sequence constraints before, concurrently, or after receiving the speech. For example, in some embodiments, the word-sequence constraints include metadata of the speech, such as a number of words in the speech or the absence of a specific word in the speech. Such word-sequence constraints can be collected at any time.

In another embodiment, the word-sequence constraints are more specific to the context of the speech. For example, the word-sequence constraints can include information about initial interpretation of the speech, and such information is used to re-evaluate the interpretation of the entire speech. One variation of this embodiment minimizes the cognitive load on the user by using a user interface to allow for correction of specific words within a speech recognition hypothesis. The corrections are fed back into the system as constraints which are used to increase the probability that hypothesis of the speech is correct, thus reducing, the number of correction actions required.

Accordingly, one embodiment discloses a method for recognizing speech including a sequence of words. The method includes generating a set of interpretations of the speech using an acoustic model and a language model; determining, for each interpretation, a score representing correctness of an interpretation in representing the sequence of words to produce a set of scores; determining a constraint for recognizing the speech subject to a word sequence constraint; and updating the set of scores based on a consistency of each interpretation with the constraint. The steps of the method are performed by a processor.

Another embodiment discloses a method for recognizing speech of a user, including steps of recognizing the speech to generate a set of interpretations associated with a corresponding set of scores representing correctness of each interpretation in representing the speech; and updating iteratively the set of scores subject to at least one constraint, such that, for each iteration, a score of each interpretation is increased if the interpretation is consistent with the constraint, and is decreased if the interpretation is inconsistent with the constraint. The steps of the method are performed by a processor.

Yet another embodiment discloses a system for recognizing speech. The system includes a processor implementing a speech recognition module and an error correction module, wherein the speech recognition module generates a set of interpretations of the speech input using an acoustic model and a language model, and determines, for each interpretation, a score representing correctness of an interpretation in representing the speech; and wherein the error correction module determines a constraint for recognizing the speech, and updates the score of each interpretation based on a consistency of the interpretation with the constraint.

DETAILED DESCRIPTION OF PREFERRED EMBODIMENT

Figure 1A:
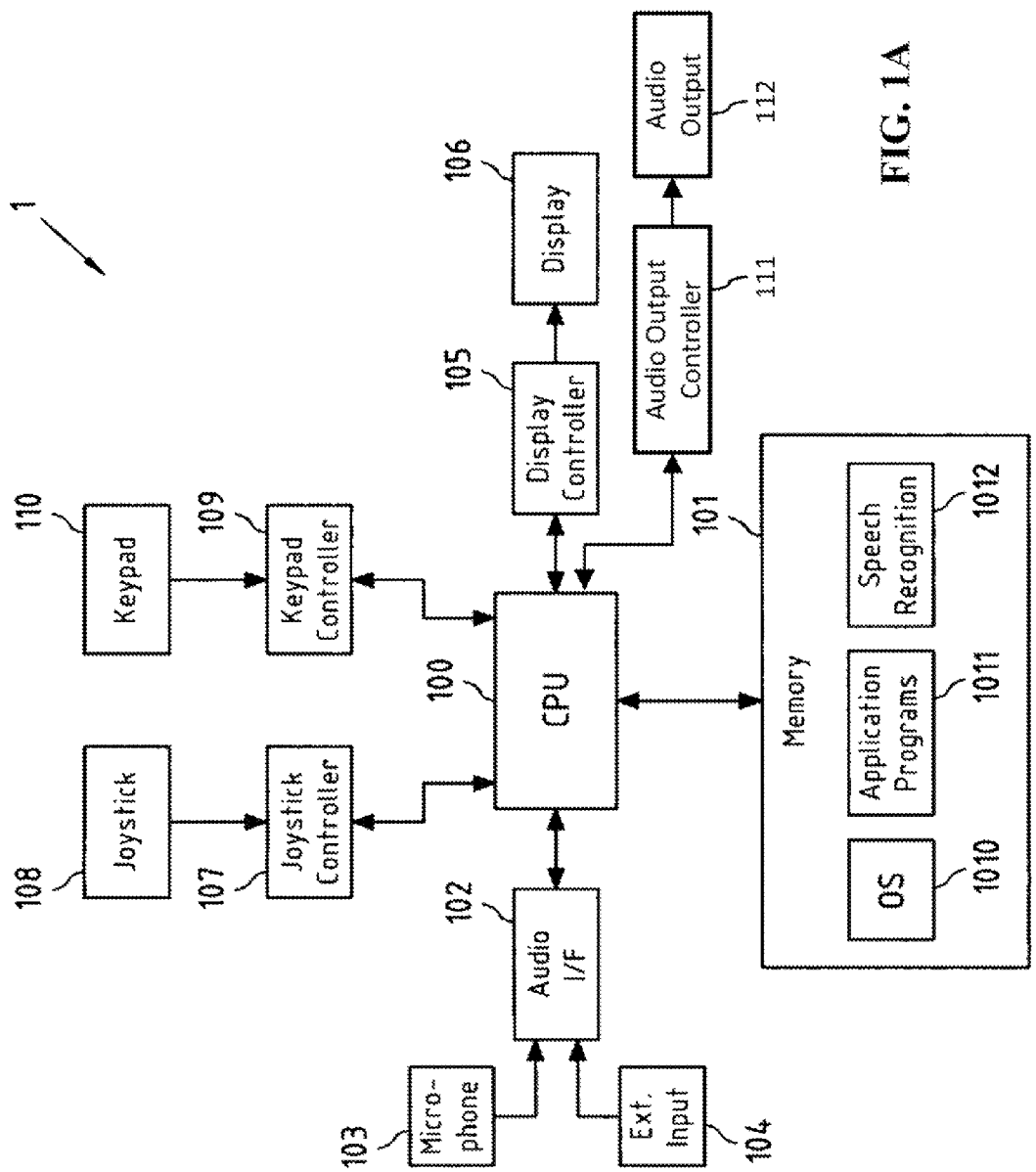
FIG. 1A is a schematic of components of a system for speech recognition according to one embodiment of the invention.

FIG. 1A shows an example of a system 1 capable of implementing a method for recognizing speech while minimizing a cognitive load on a user uttering the speech according to some embodiments of the invention.

The system 1 includes a central processing unit (CPU) 100, which controls the operation of the entire system. The system 1 interacts with a memory 101, which comprises, software related to an operating system (OS) 1010 of the system, application programs 1011 that can be executed by the CPU 100 to provide specific functionalities to a user of the system, such as dictation and error correction, and software 1012 related to speech recognition. The system 1 further comprises an audio interface (I/F) 102 to receive speech, which may can be recorded by microphone 103 or received from external input 104, such as speech acquired from external systems.

The system 1 can further include one or several controllers, such as a display controller 105 for controlling the operation of a display 106, which may for instance be a Liquid Crystal Display (LCD) or other type of the displays. The display 106 serves as an optical user interface of system 1 and allows for example to present sequences of words to a user of the system 1. The system 1 can further be connected to an audio output controller 111 for controlling the operation of an audio output system 112, e.g., one or more speakers. The system 1 can further be connected to one or more input interfaces, such as a joystick controller 107 for receiving input from a joystick 108, and a keypad controller 109 for receiving input from a keypad 110. It is readily understood that the use of the joystick and/or keypad is of exemplary nature only. Equally well, a track ball, or arrow keys may be used to implement the required functionality. In addition, the display 106 can be a touchscreen display serving as an interface for receiving the inputs from the user. Furthermore, due to the ability to perform speech recognition, the system 1 may completely dispense with any non-speech related interfaces altogether. The audio I/F 102, joystick controller 107, keypad controller 109 and display controller 105 are controlled by CPU 100 according to the OS 1010 and/or the application program 1011 CPU 100 is currently executing.

Figure 1B:
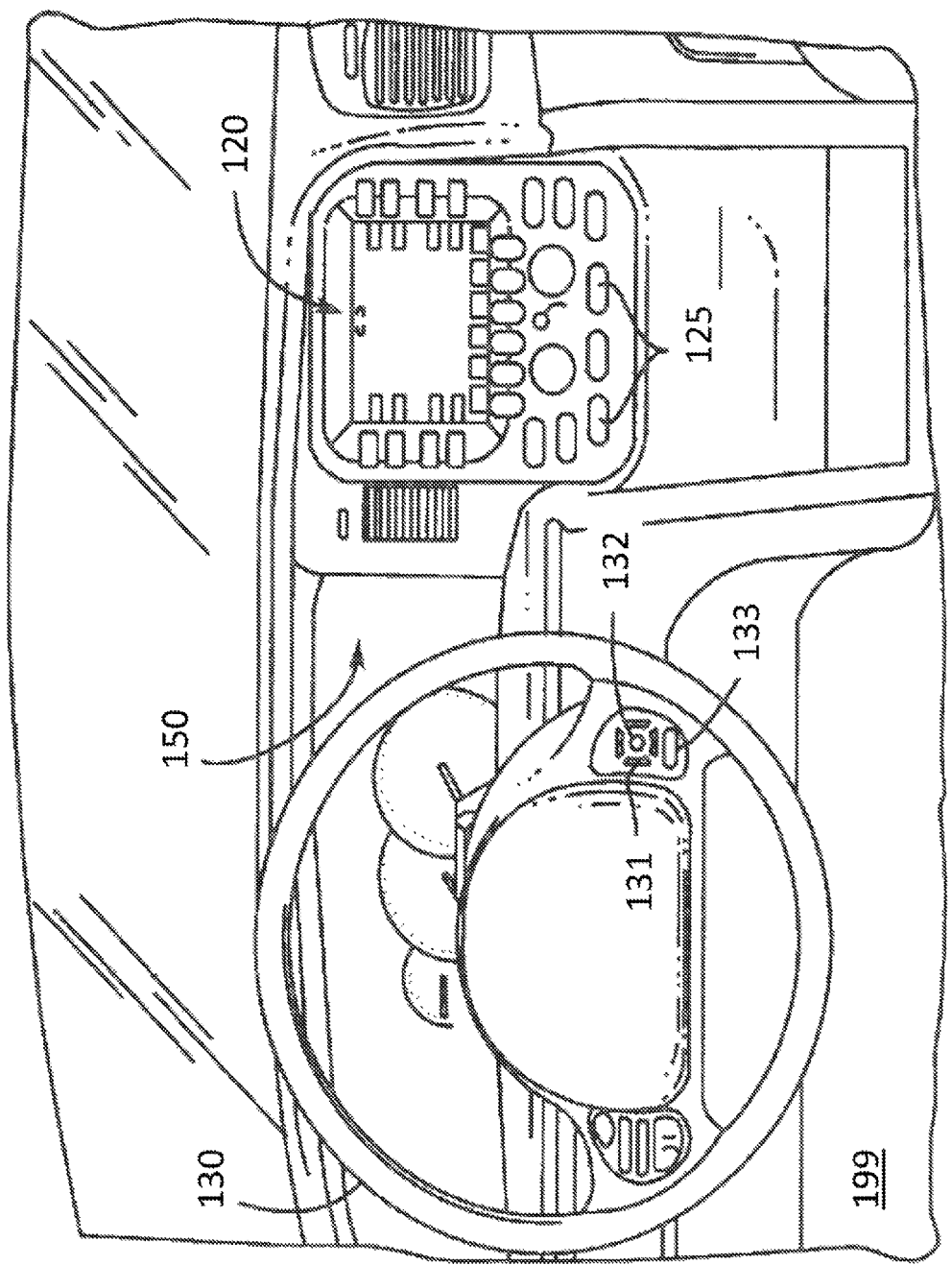
FIG. 1B is a partial front view of an instrumental panel of a vehicle including the system according some embodiments of the invention.

As shown in FIG. 1B, the system 1 can be embedded in an instrumental panel 150 of a vehicle 199. Various controls 131-133 for controlling an operation of the system 1 can be arranged on a steering wheel 130. Alternatively or additionally, the controls 125 can be place on a control module 120. The system 1 is configured to improve the interpretation of speech of the user to reduce a number of user interactions, so that the user can concentrate on operating the vehicle.

Figure 2A:
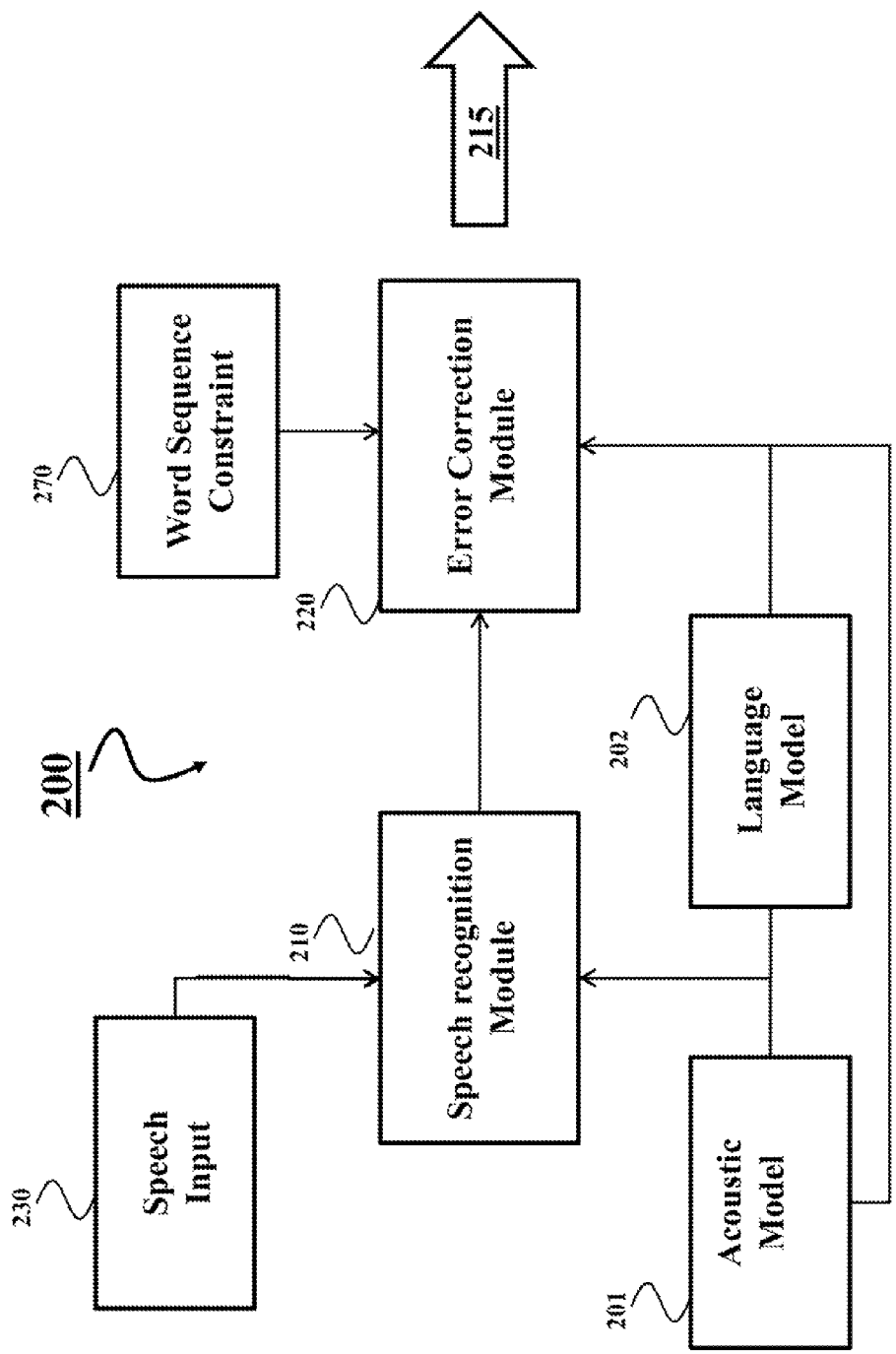
FIG. 2A is a block diagram illustrating the functionality of a speech recognition module according to one embodiment of the invention.

FIG. 2A schematically shows the functionality of a speech recognition system 200 with improved error correction capabilities according to some embodiments of the invention. The speech recognition unit 200 includes a speech recognition module 210, which can be implemented by the CPU 100 of the system 1 by executing the speech recognition software 1012 stored in the memory 101.

The speech recognition module 210 receives a speech 230, which is a spoken representation of a sequence of words (for instance a complete sentence). In various embodiments, the speech includes one or combination of audio signal, speech features, or frame-based acoustic scores. The sequence of words typically includes multiple words, three or more words.

The speech recognition module is configured to perform speech recognition of the speech 230 to determine a set of interpretations that, in the optimal case, resembles the sequence of words represented by the speech. Each interpretation in the set includes a sequence of words. The speech recognition module can use an acoustic model 201 and a language model 202.

The acoustic model 201 can for instance be stored in memory 101 of the system 1 and in one embodiment describes the conditional probabilities of sequences of acoustic features given a word sequence hypothesis, or other sequence of units representing the phonetic properties of words. The acoustic model can include phonemes or some other sound units. In some embodiments the acoustic model can include a phoneme sequence model, a model of sub-phonetic state sequences, and a Gaussian mixture model for the probability of the acoustic features given each sub-phonetic state. In other embodiments the acoustic model can include a transformation from acoustic features to phonetic state sequence probabilities that uses, for example, a neural network.

The language model 202 can also be stored in the memory 101 of the system 1 and can include statistics on the probability of a sequence of words comprising at least one word to occur in a language. The language model 202 can for instance be a uni-gram language model that is related to the likelihood of a single word to be used in a language, or a hi-gram language model that expresses a likelihood of two words of a language following each other. Also language models considering a larger number of subsequent words may be used, e.g. a tri-gram language model, etc.

In some embodiments, the speech recognition module 210 performs speech recognition by segmenting the speech into segments that are assumed to relate to single words, and then recognizes the single words, for instance by identifying phonemes in the input speech sequence segments and by comparing the phonemes to a phoneme-to-text mapping of the language model 202.

The speech recognition module 210 generally identifies a set of possible interpretations for each input speech sequence segment, where each interpretation includes a sequence of words. Interpretations are also known as recognition results. Each interpretation is associated with a recognition confidence value, e.g., a score representing correctness of an interpretation in representing the sequence of words. The score expresses a confidence of speech recognition that the recognition result is correct. For each input speech segment, the speech recognition module can determine the recognition result, e.g., a word, with the largest recognition confidence value, yielding a sequence of words that is considered to represent the input speech sequence.

Accordingly, the speech recognitions of speech are further refined by taking the language model 201 into account. Then addition to the recognition confidence values, a probability that a set of one or more words occurs in a language is taken into account in generating a set of interpretations of the speech using a language model and a recognition vocabulary. For example, in case of a bi-gram language model, even when a possible recognition result has a high confidence with respect to the acoustic space, e.g. "free" as opposed to "three," due to the bi-gram language model, the Speech recognition module 210 may nevertheless decide for "three," using the context, for instance "at" and "o'clock" in the intended sequence of words "at three o'clock."

Figure 2B:
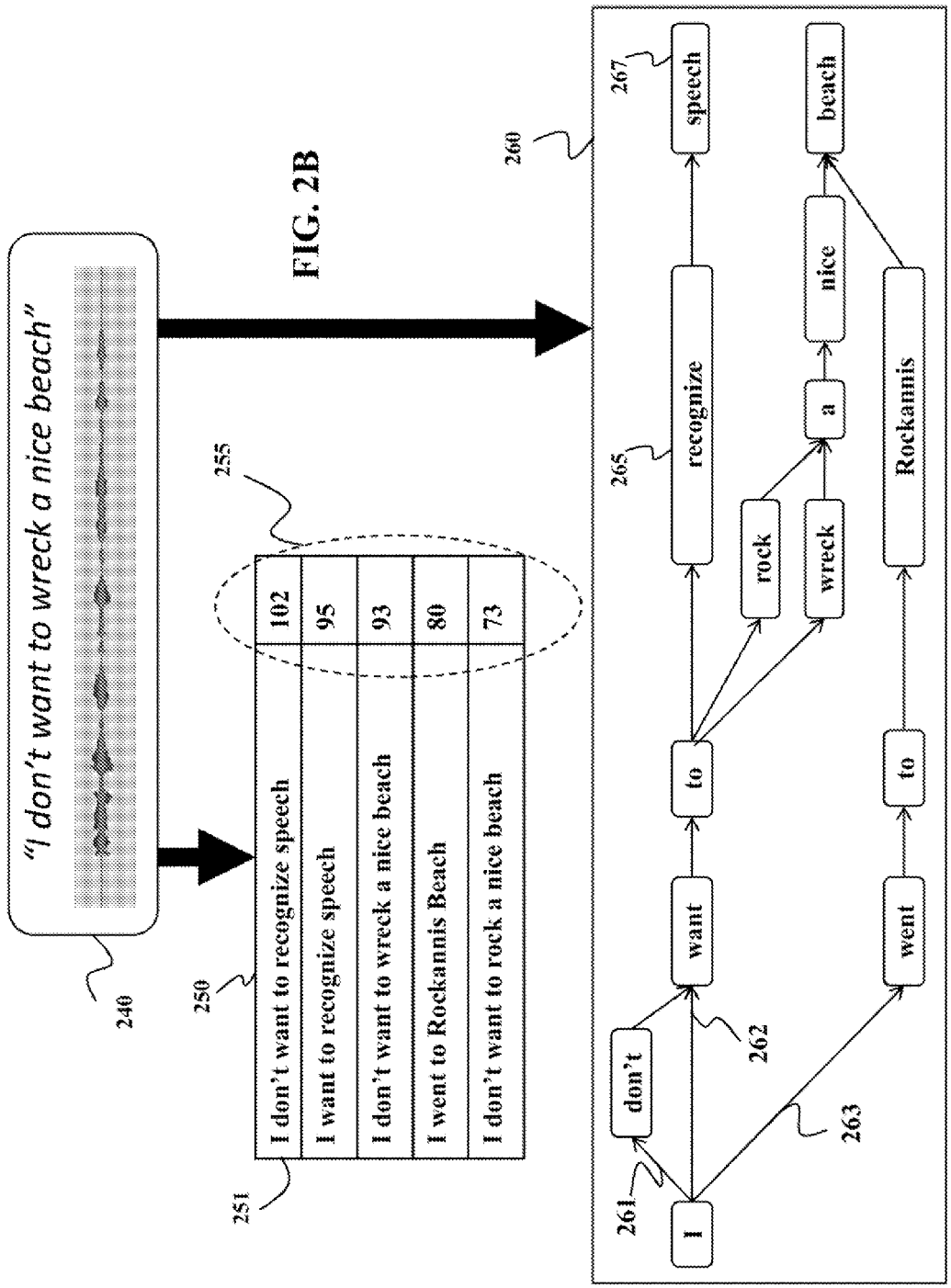
FIG. 2B is an example of steps of the method of FIG. 2A.

FIG. 2B shows examples of the set of interpretations of the speech 240. In some embodiments, the set of interpretations is determined or represented as an n-best list 250 of the speech or as a word lattice 260 of the speech. In addition, various embodiments determine, for each interpretation in the set 251, a score, e.g., the score 255, representing correctness of an interpretation subject to the word-sequence constraint. The score can be determined by a number of ways.

For example, an alternative representation of the set of interpretations is a graph known as a lattice 260, in which nodes, e.g., nodes 265 and 267, represent each hypothesized word that is identified with particular region of the speech, and occurs with a particular context. In this representation, words and word sequences that occur in the same place in many hypotheses in the n-best list can be reduced to sharing a common sub-path in the lattice. In addition to the words, the arcs of the lattice can include the acoustic and language model scores, such that the overall score for a word sequence can be derived from the scores along a path through the lattice. For example; the arcs 261, 262, and 263 can represent a score defined by corresponding probabilities of words "don't," "want" and "went" following the word "I."

In some embodiments, the speech recognition system is formulated as a probabilistic model, and the score is based on the probability of an interpretation, or sequence of words given an observed sequence of acoustic features. An interpretation can include a sequence of words, and may also identify the approximate time region of the utterance corresponding to the hypothesized word.

The score $S(W|X)$ in some embodiments is based on the probability of the word sequence given the acoustic data. For example:

$$S(W|X) \propto p_\theta(W|X)$$

where $\propto$ denotes proportionality (i.e., $S(W|X)=p_\theta(W|X)c$, where c is a positive constant), $\theta$ are parameters of the model, $p_\theta$ denotes a probability measure using parameters $\theta$, $W=\{w_i\}_{i=1}^{N}$ is the hypothesized sequence of words $w_1$, $w_2, \ldots, w_N$ in the interpretation, and $w_i$ is the word hypothesized in position (for a hypothesis with N words). The acoustic features are denoted $X=\{x_j\}_{j=1}^{T}$, where $x_j$ is the jth vector of acoustic features of the utterance (for an utterance with M acoustic feature vectors). $p_\theta(W|X)$ is known as the posterior probability of W given X. In another embodiment, the score can be defined as the logarithm of this quantity:

$$S(W|X)=\log p_\theta(W|X)+k,$$

where k is an arbitrary constant.

In one embodiment, the score is separated into different sub-scores:

$$S(W|X) \propto p_{\theta_{LM}}(W) p_{\theta_{AM}}(X|W),$$

where $p_{\theta_{LM}}(W)$ is a score from a word language model with parameters $\theta_{LM}$, and $p_{\theta_{AM}}(X|W)$ is a score from an acoustic model with parameters $\theta_{AM}$. For simplicity hereafter we omit the parameters, except where necessary.

Another embodiment associates a word sequence with a sequence $\hat{R}=\{\hat{r}_i\}_{i=1}^{N}$ of hypothesized time regions of the utterance for each hypothesized word such that $\hat{r}_i$ is the position hypothesized for word $w_i$. In that embodiment the score can be based on an expanded model with an alignment term, $p(R|W)$, such that $p(W)p(X|W)=\max_R p(W)p(R|W)p(X|W, R)$. In that embodiment, $\hat{R}$ is obtained by maximizing the score over the set of all possible alignments $\delta$:

$$\hat{R} = \underset{R \in S}{\mathrm{argmax}}\, p(W) p(R|W) p(X|W, R),$$

and the acoustic score for the subsequence of features $X(\hat{r}_i)$ corresponding to region $\hat{r}_i$ associated with the hypothesized word $w_i$ is $p(X(\hat{r}_i)|w_i)$.

The language model score can be computed in many ways, including using a discrete probabilistic model, a neural network, discriminatively trained conditional random fields, and so on. For example, one embodiment formulate the probabilistic model as $$p(W) = p(w_1, w_2, \ldots, w_N) = p(w_1)\prod_{i=2}^{N} p(w_i | w_1, \ldots, w_{i-1}).$$

The probabilities are conditional on words occurring earlier in the sequence, known as the context. Typically the general model is too complex, and a simpler model known as an n-gram model is used, where the context is limited to the preceding it n–1 terms:

$$p(W) = p(w_1, w_2, \ldots, w_N) = p(w_1)\prod_{i=2}^{N} p(w_i | w_{min(1,i-n+1)}, \ldots, w_{i-1}).$$

In some embodiments, various other parameterizations and estimation procedures are used with n-gram models to improve their ability to generalize from training data to test data.

Inference in a speech recognition model can be characterized as a search over hypotheses W to find the best scoring hypothesis, $$\hat{W} = \max_{W} p(W)p(X | W).$$

In addition typically n-best hypotheses with the largest scores are determined. The evaluation of every possible W can be computationally extensive, and some embodiments determine the n-best hypotheses using a recursive dynamic programming algorithm, e.g., as the Viterbi algorithm, combined with heuristic reduction of the search process, e.g., a beam search. Many alternative search algorithms and heuristics also exist and are employed by various embodiments.

In some embodiments, the output of the search over the hypotheses can be an n-best list 250, comprising n interpretations of the sequences of words, along with the scores of the interpretations 255, e.g., one or combination of the scores of the acoustic model and the scores of the language model. Some embodiments provide as an output the best scoring alignment of the words with the temporal segments of the acoustic signal.

In some embodiments, the output of the search over hypotheses can be the lattice 260. Determining scores is typically more efficient in the lattice than using an n-best list. However for the clarity purposes, some embodiments are described using the n-best representation.

Although the language model and acoustic model constrain the search, the produced recognition ma still have ambiguities and errors. For example, the interpretation 251 having the highest score can still be inaccurate. However, requesting the user to correct the specific interpretation 251 disregards other interpretations, which might include the correct interpretation. Also, the request to correct the specific interpretation can require multiple interactions with the user, and can distract the user from other tasks.

Some embodiments of the invention are based on a general realization that corrections of recognition results of large-vocabulary continuous speech including a sequence of words should be based on constraints for the interpretation of the entire speech. Such constraints can improve probability of interpreting the entire speech correctly, as contrasted with corrections that only modify a single word.

Accordingly, the speech recognition unit 200 also includes an error correction module 220 which reinterprets recognition results by taking the language model 202 and a word sequence constraint 270 into account. Specifically, in some embodiments, the error correction module 220 updates the score of each interpretation based on a consistency of the interpretation with the constraint 270. After the update, the interpretation 215, e.g., with the highest score, can be determined and outputted as the recognized speech.

Some embodiments are based on a realization, the constraints for interpreting the entire speech can be complemented by word-sequence constraints 270 of the speech provided, e.g., by a user uttering the speech. For example, the word-sequence constraints can include a number and order of the words in the speech, a specific word uttered at specific time in the speech, the absence of the specific word in the speech, a connection or separation of two specific words in the speech. The word-sequence constraints can also specify the topic of the speech output, for instance that the topic of the speech is pollution.

This realization allows minimizing an effort of the user to correct the speech, because the word-sequence constraints can lead to the correction of the entire interpretation of the speech, while the correction of the word can lead to the correction of that word only. Notably, the constraint 270 can be used to update the score of the entire set of the interpretation.

Thus, in some embodiments, the word-sequence constraint is used concurrently with the interpretation of the speech, as contrasted with using the constraints for subsequent correction of a portion of the speech. The best-scoring interpretations of the entire speech are determined subject to word-sequence constraints. The interpretation with the largest score can be determined as the recognized speech. In effect, such approach can minimize a number of interactions required to determine correct interpretation of the speech sequence.

Figure 3A:
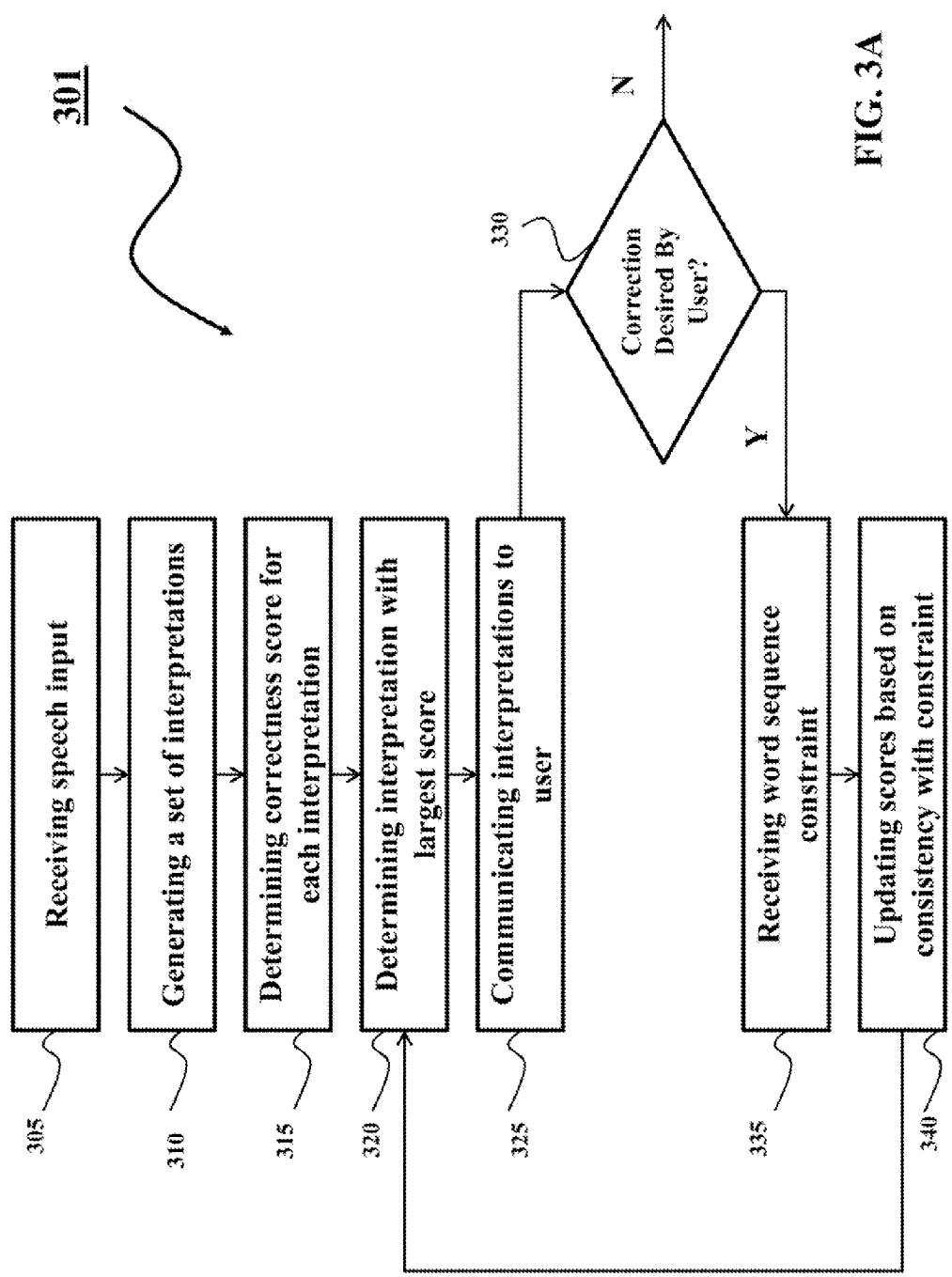
FIGS. 3A, 3B, 3C and 3D are flowcharts of the steps performed by methods for error correction in speech recognition according to various embodiments of the invention.

FIG. 3A shows a flow chart of a method for recognizing a speech of a user according to one embodiment of the invention. The method 300 employs some principles and realizations described above and can be implemented using a processor 301. The method receives 305 the speech representing a sequence of words and generates 310 a set of interpretations of the speech using an acoustic model and a language model. The set of interpretations comprises one or more interpretations where each interpretation is a possible sequence of words that could have been spoken. Various embodiments receive or generate the interpretations as an n-best list of interpretations, a word-lattice, or other representation of the set of possible word sequences.

For each interpretation, the method determines 315 a correctness score thr that interpretation to produce a set of scores. For example, the scores can be determined based on probabilities given by the acoustic model and the language model and/or a correctness function described below. In some embodiments, the method determines 320 the interpretations with the largest score, and communicates 325 a subset of interpretations to the user. In one embodiment, only the interpretation with the largest score is communicated to the user. In alternative embodiment, multiple interpretations are communicated.

Various embodiments use user interface components to allow the user to provide constraints for the set of interpretations if necessary. The method decides 330 whether a correction using the word sequence constraints is desired based on input from the user given through the user interface components. User can provide constrains using any interface of the system 1 or a combination thereof. For example, user can use the keypad 110, the joystick 108, the touchscreen of the display 106, a speech interface 103, and combination thereof.

When the correction is desired, the method receives 335 a constraint on the word sequence. Various embodiments receive or determine the word sequence constraint based on user interface actions through user interface components such as choice lists, buttons, etc. In some embodiments of the system, the word sequence constraints are represented as probabilities of the occurrence of various events.

In some embodiments, the word sequence constraint, includes metadata of the speech, such as a number of words in the speech or absence of a specific word in the speech. The metadata of the speech is information about the word sequence as contrasted with the information related to the context of the word sequence. Such word-sequence constraints can be collected at any time.

The method updates 340 the scores of the set of interpretations of the speech according to how consistent each interpretation is with the constraint. After the scores are updated, the highest score is determined 320, and the method continues iteratively until no more corrections are desired by the user. The set of interpretations may be output from the method, e.g., stored into the memory, for being use later.

Figure 3B:
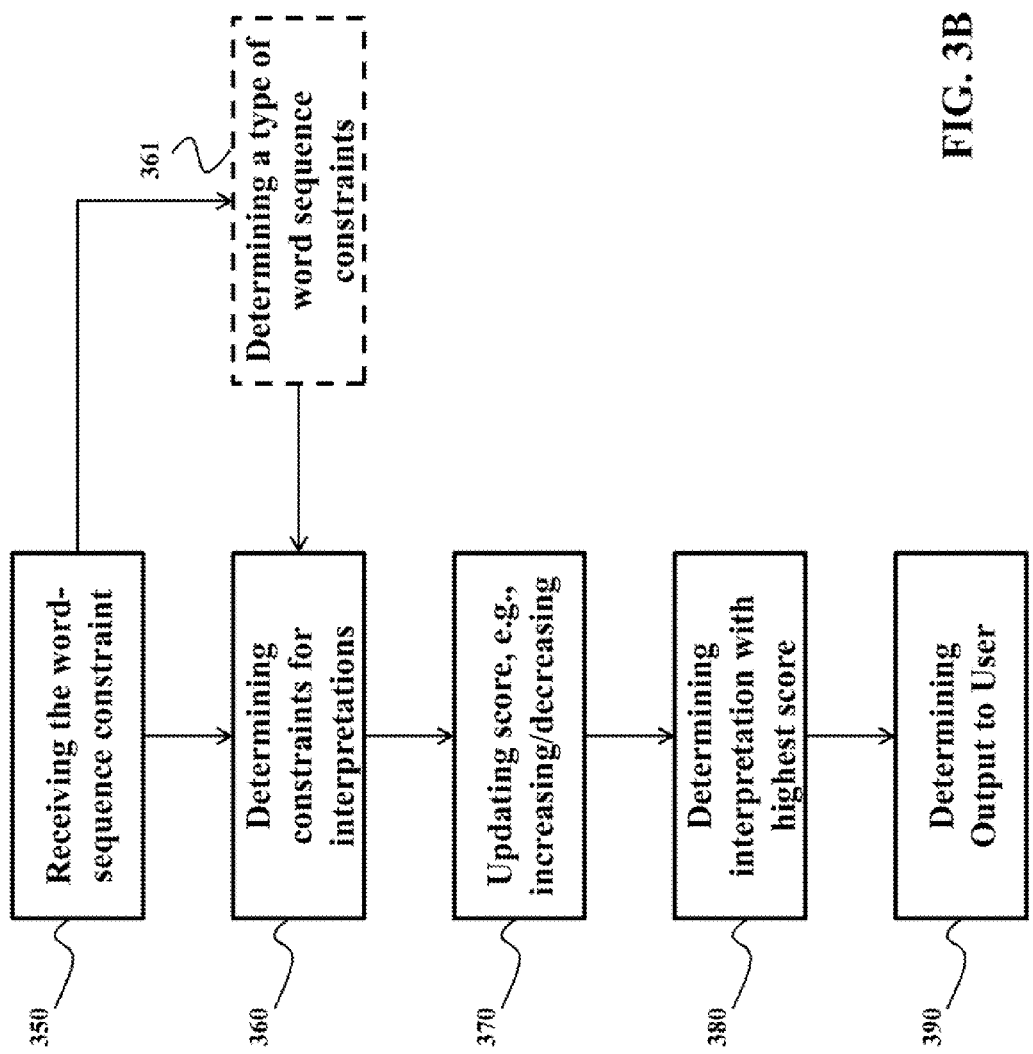

FIG. 3B shows a flowchart of a method for updating the score of the interpretation subject to constraints. The word sequence constraints are received 350 from the user. In some embodiments, the word sequence constraint is modified to determine 360 the constraints suitable for the interpretation. For example, some embodiments determine the constraints based on the word sequence constraint received from the user.

For example, in some embodiments, the word sequence constraint is received from the user in response to communicating the subset of interpretations. The embodiments determine 361 a type of the constraint based on the word sequence constraint and determine 360 the constraint based on the type. For example, the type of the constraint can be one or a combination of a language type: a constraint on the language probabilities, an acoustic type: a constraint on the probability distribution of the acoustic features given the hypothesized words, and a context type: a constraint on the word sequences within the interpretations.

Figure 3C:
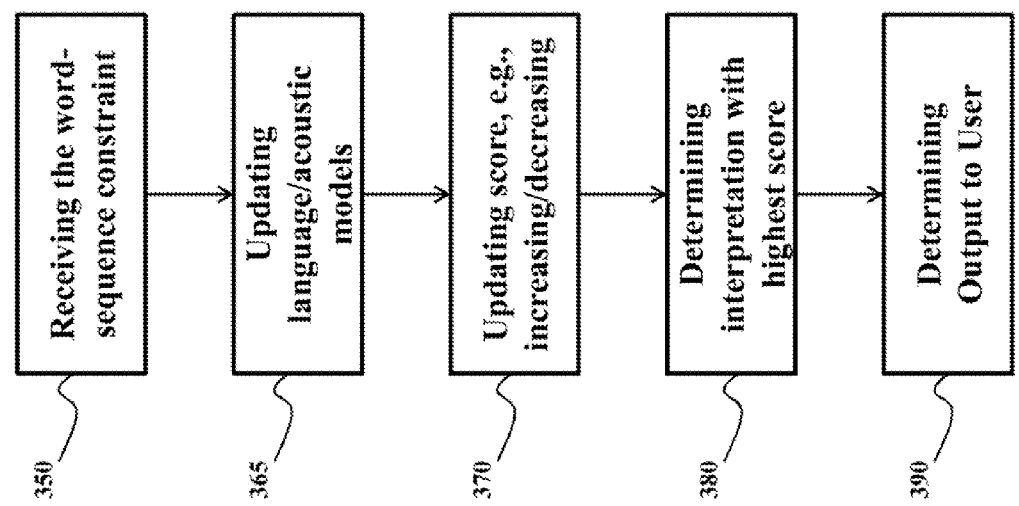

FIG. 3C shows an example of determining the constraints according to some embodiments, where the type of the determined constraints is based on the scores to be updated. Those embodiments update 365 one or combination of the language and/or acoustic models. Some embodiments determine the type of the constraint based on the word sequence constraint received from the user. For example, in some embodiments, the word-sequence constraints include metadata of the speech, such as a number of words in the speech, topic of the speech, a number of words spoken within specific period of speech. Those constraints are usually language or acoustic type constraints.

In another embodiment, the word-sequence constraints are more specific to the context of the speech. For example, the word-sequence constraints can include information about presence or the absence of a specific word in the speech. Those constraints are usually the context type constraints.

For example, if the word sequence constraint is a number of words in the sequence, in one embodiment, the updating of the scores is done by re-computing the language model scores, for example, using p(W|length(W)=6). In one variation of this embodiment, the acoustic model scores, and the estimated regions R corresponding to each word are left unchanged.

In one embodiment, the type of the constraint is the language type and the updating of the scores is done by re-computing the language model scores using a modified language model. For example, instead of the original language model $p_{\theta_{LM}}(W)$ the lattice is rescored using $p_{\theta'_{LM}}(W)=p_{\theta_{LM}}(W|\text{length}(W)=6)$. Here $\theta_{LM}$ are the original language model parameters, and $\theta'_{LM}$ are the parameters obtained by conditioning on the constraint that there are six words in the sequence. The score can thus be updated by evaluating $$S'(W|X) \propto p_{\theta'_{LM}}(W) p_{\theta_{AM}}(X|W),$$

where S'(W|X) is the modified score.

One embodiment imposes a constraint that the topic is "pollution," in a similar way. The embodiment uses a constrained language model $p_{\theta'_{LM}}(W)$ with parameters $\theta'_{LM}$ that are appropriate for word sequences on the topic of "pollution." Thus the embodiment can update the score function S'(W|X) above using the constrained language model.

Given, the updated score of each interpretation, rescoring amounts to evaluating the score using the modified score function on each entry of the n-best list. Alternatively a graph of possible word sequences, based on the lattice or n-best list, can be efficiently searched using various algorithms such as the forward backward algorithm, Viterbi decoding, or stack decoding, using the modified score function. In the process of evaluating the scores, a modified n-best list or lattice is generated.

If the constraint is only on word sequences, then the acoustic model scores, such as $p_{\theta_{AM}}(W)$ in the above example, and the estimated regions R corresponding to each word may be left unchanged. However, in other embodiments the type of the constraint is the acoustic type and the acoustic scores p(X|W) are changed depending, on the constraints. For example, in the case where an alignment between the words and acoustic features is computed, the rescoring may also be dependent on the alignment. One embodiment defines the model $p(W)p(X|W)=\max_{R \in S} p(W)p(R|W)p(X|W, R)$, and updates the scores based on constraints on R:

$$p(W)p(X \mid W) = \max_{R \in C} p(W)p(R \mid W)p(X \mid W, R),$$

where $C \subseteq S$ represents a subset of allowed alignments enforcing the desired constraint. For example, one such constraint, can be that there is only one word within a particular time region.

Figure 3D:
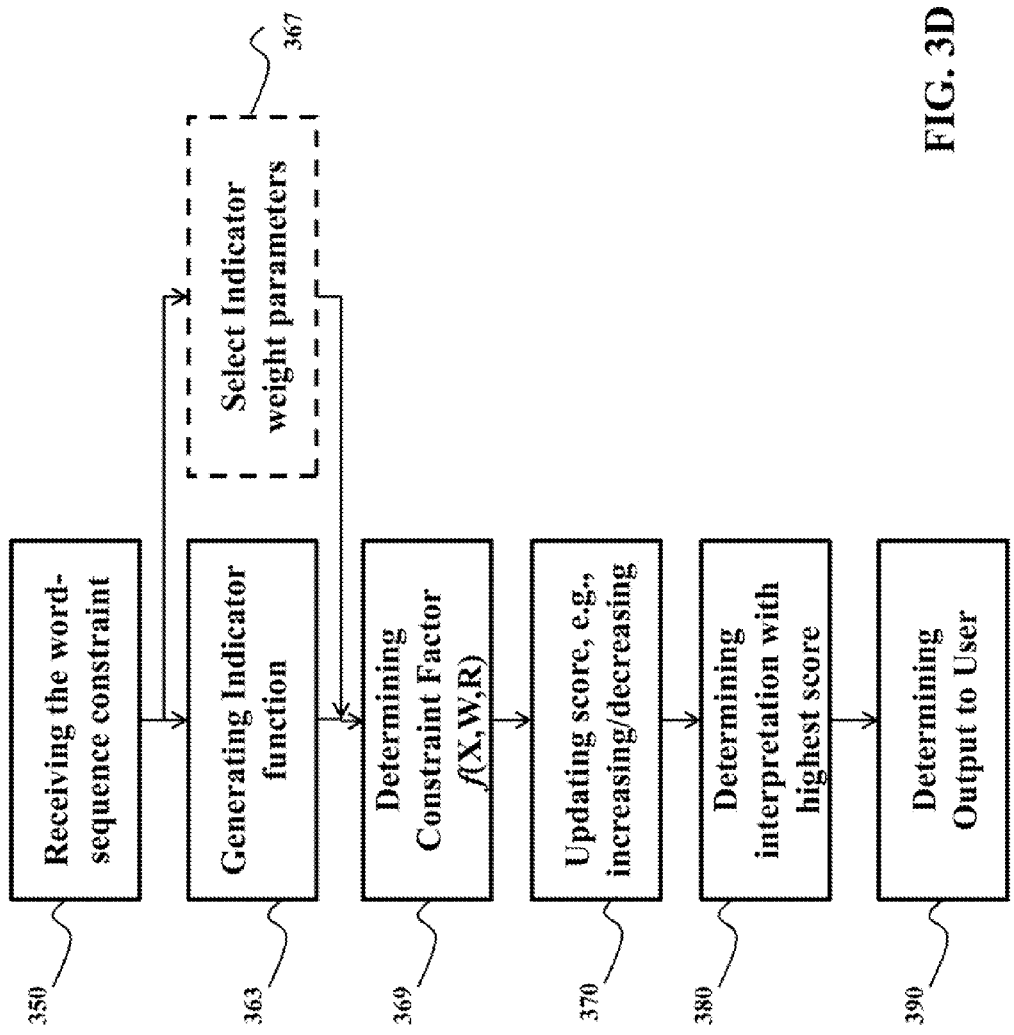

FIG. 3D shows a flowchart of a method for determining absolute or relative constraints for updating the scores. In some embodiments, if a constraint is absolute, then the interpretation of the word sequence that does not match the constraint is rescored with a smallest possible score. Conversely, if a constraint is relative, e.g., a probabilistic, an interpretation that does not match the constraint is rescored with a smaller weight than interpretations that do match the constraint, but a non-matching interpretation may still have a final score higher than the scores of the interpretation consistent with the relative constraint.

For example, in some embodiments the relative constraints have continuous values representing different degrees of constraint satisfaction. Such constraints can be formulated using a multiplicative factor representing the constraint. In one embodiment, the constraint includes a constraint factor $f(X, W, R)$ 369 the output of which is a number indicating the degree of constraint satisfaction for one or more of an acoustic sequence, a word sequence, and an alignment. Using this constraint factor one embodiment formulates a general rescoring function:

$$S'(W \mid X) \propto \max_{R \in S} p(W) p(R \mid W) p(X \mid W, R) f(X, W, R).$$

Depending on the constraint factor many different kinds of constraints can be implemented, including the cases with absolute and relative constraints. For example, in some embodiments, the constraint factor can be determined using an indicator function 363 mapping the word sequence constraint specified by the user with the constraint suitable for updating the scores of the interpretation and a weight parameter 367 indicating a degree of the relative constraint (up to making the relative constraints absolute).

For example, if the constraint factor $$f(X,W,R) = f(W) = \alpha I_{length(W)=6} + \beta,$$

where the notation $f(W)$ indicates that the constraint factor does not depend on X and R in this case, $\alpha$ and $\beta$ are a non-negative weight parameters representing the degree of constraint satisfaction, and for example, $$I_{length(W)=6} = \begin{cases} 1, & length(W) = 6 \\ 0, & otherwise \end{cases},$$

is an indicator function for the constraint that there are six words in the sequence. If weight parameter $\alpha$ is large relative to $\beta$ then the constraint satisfaction is strong, otherwise the constraint is weak. An absolute constraint may be achieved by setting $\beta$ to zero so that the function $f(W)$ has zero value in all cases that are not desired.

In another embodiment a constraint on the alignment can be implemented using $f(X,W,R)=f(R)=\alpha I_{R \in C}+\beta$, where $I_{R \in C}$ is an indicator function for the condition that R is in the constraint set C.

In the case with the constraint embodied in a constrained language model $p_{\theta'_{LM}}(W)$ with parameters $\theta'_{LM}$, the constraint factor is $$f(X, W, R) = \frac{p_{\theta'_{LM}}(W)}{p(W)},$$

where $p(W)$ is the language model used in the initial recognition. This has the same effect on the scores as substituting the new model $p_{\theta'_{LM}}(W)$ for the old one $p(W)$.

Note that after rescoring, the absolute scale of $f$ does not influence the relative scoring of different word hypotheses, so that any other constraint factor proportional to another, $f'(X, W, R) \propto f(X,W,R)$, produces the same effect on the resulting n-best list or lattice.

Additionally or alternatively, multiple constraints for the interpretation can be determined based on the word sequence constraint received from the user. For example, if the user indicated that a word in the word sequence is correct, some embodiments determine that the words at the left or at the right of the word (depending on the language model) are correct as well. In those embodiments, additional constraints for neighboring words are generated.

For example, in one embodiment, the scoring function tests for presence of the specific word. For example, a direction of the speech can be determine based on the language model, and the scoring function is updated with a test for presence of the words preceding and following, according to the direction of the speech, the specific word in the interpretation communicated to the user. In this embodiment, the scoring function test not only for the specific word, but also for other words neighboring the word from the direction of the speech.

After the constraint for interpretation is determined, the scores of some interpretations are updated 370 based on a consistency of a specific interpretation with the constraint, in some embodiments, each interpretation is updated, such that the score of each interpretation may be either increased or decreased. That means that after the update 370, the score of each interpretation may be either increased or decreased. Some variations of the embodiments allow the score of some interpretations to remain unchanged.

After the scores are updated, the interpretations with the largest score are determined 380, and the output to the user is formed 390 and communicated to the user. Some embodiments communicate the interpretations using visual means such as words and characters shown on a display. Some embodiments communicate the interpretations using audio feedback such as sounds produced from a speaker using Text-to-speech or recorded audio waveforms. Various embodiments may communicate one or multiple interpretations with the best scores.

Figure 4:
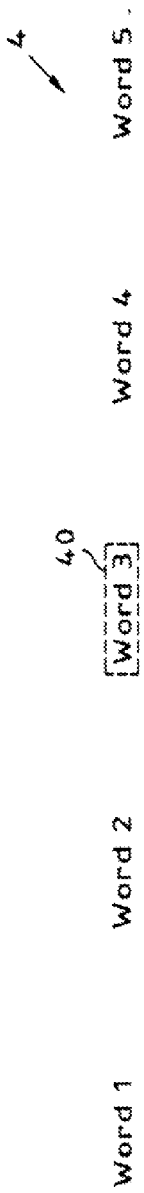
FIG. 4 is a schematic of a sequence of words with an emphasized word according to one embodiment of the invention.
Figure 5:
FIG. 5 is a schematic a sequence of words with two emphasized words according to one embodiment of the invention.
Figure 6:
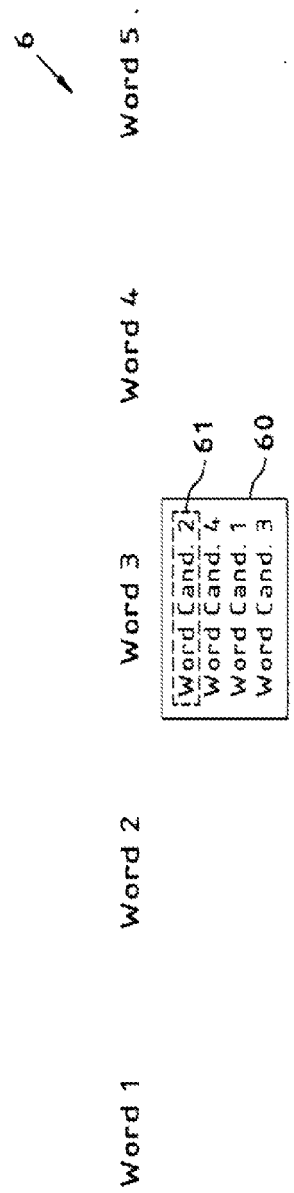
FIG. 6 is a schematic a sequence of words and a sorted set of word candidates according to one embodiment of the invention.

FIGS. 4, 5 and 6 show examples of interfaces for selecting the word-sequence constraint based on interpretations communicated to the user of the speech. The interpretation can be an initial interpretation of the speech, or subsequent interpretations chosen after updating the scores.

The Sequence of words 4 is a sentence that comprises five words, wherein the third word (Word3) is furnished with an emphasizing dashed frame 40. In another embodiment, the Word3 is determined as a most efficient constraint for the word-sequence.

Furthermore, in the example of FIG. 4, the dashed frame 40 is not only meant for emphasizing, but also represents a selector, which can be moved h a user in order to select words that are erroneously recognized and thus need correction. Such movement may for instance be performed word-by-word by means of a joystick or by arrow keys, and selection then may be performed by pressing a dedicated button or key (which may for instance be integrated into or implemented by said joystick or touch screen).

FIG. 5 shows an alternative interface, where user can select one or multiple words, e.g., Word3 and Word5. After selecting a word or word sequence, the user can perform one of the following actions: marking the selected word or sequence as correct, marking one or more of the selected word or sequence as incorrect, skipping the selected word or sequence, requesting additional choices for the selected, word or sequence, or possibly altering some other constraints such as the subject matter or style of the text.

In one embodiment, after a word or word sequence is selected, the time or time window associated with the selected word can be used to retrieve the set of words that could have been spoken at that time or time window, and some or all of these are displayed to the user, preferably ranked in order of decreasing scores.

FIG. 6 exemplifies a scroll-down list 60 for the third word (Word3) of a sequence of words 6. The scroll-down list 60 includes four word candidates, selected based on the time window corresponding to the word3. A selector 61 is automatically placed on the first entry in said scroll-down list 60, which can be vertically moved to selected entries from said scroll-down list 60.

Examples

Figure 7A:
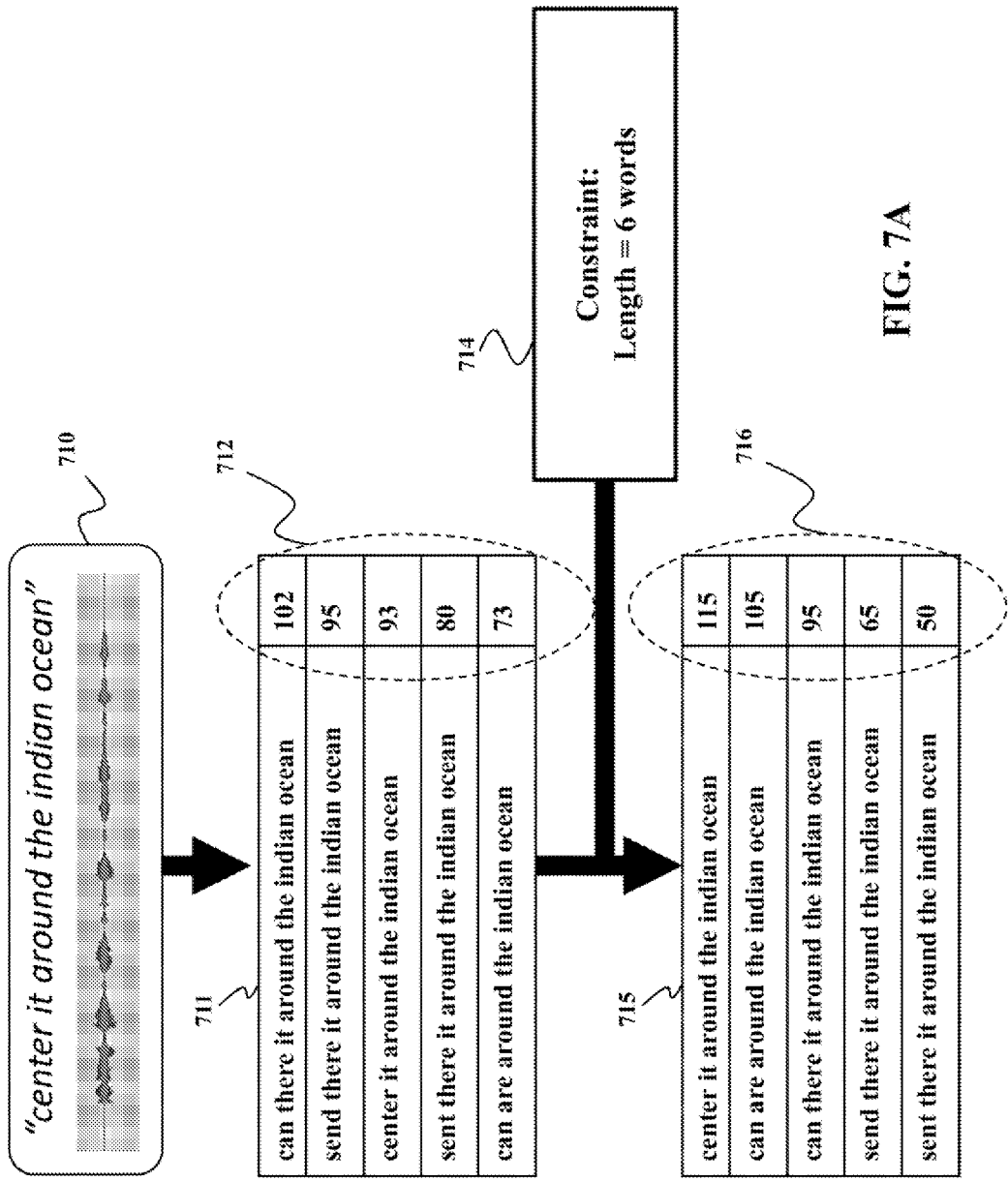
FIGS. 7A, 7B, and 7C are schematics of exemplar embodiments of the invention.

FIG. 7A shows a schematic of an exemplar method for interpreting speech 710 subject to word sequence constraint according to one embodiment of the invention. In this example, the word-sequence constraint includes a constraint 714 on a number of words, i.e., that the speech has six words. Notably, the constraint 714 is used to update the score 712 of the entire set of interpretations 711 to produce an updated set 715 with updated scores 716 of the interpretations. As can be seen from the example of FIG. 7A, the scores 716 for the entire set of the interpretations are updated.

For this exemplar embodiment, the general rescoring function $$S'(W \mid X) \propto \max_{R \in S} p(W) p(R \mid W) p(X \mid W, R) f(X, W, R),$$

may be used as described above, with a specific constraint factor $f(X,W,R)$ which gives higher weight to sequences with six words, such as $$f(X, W, R) = f(W) = \alpha I_{length(W)=6} + \beta,$$

and $$I_{length(W)=6} = \begin{cases} 1, & length(W) = 6 \\ 0, & otherwise \end{cases}.$$

Other constraint factors and/or indicator functions can also be used.

Figure 7B:
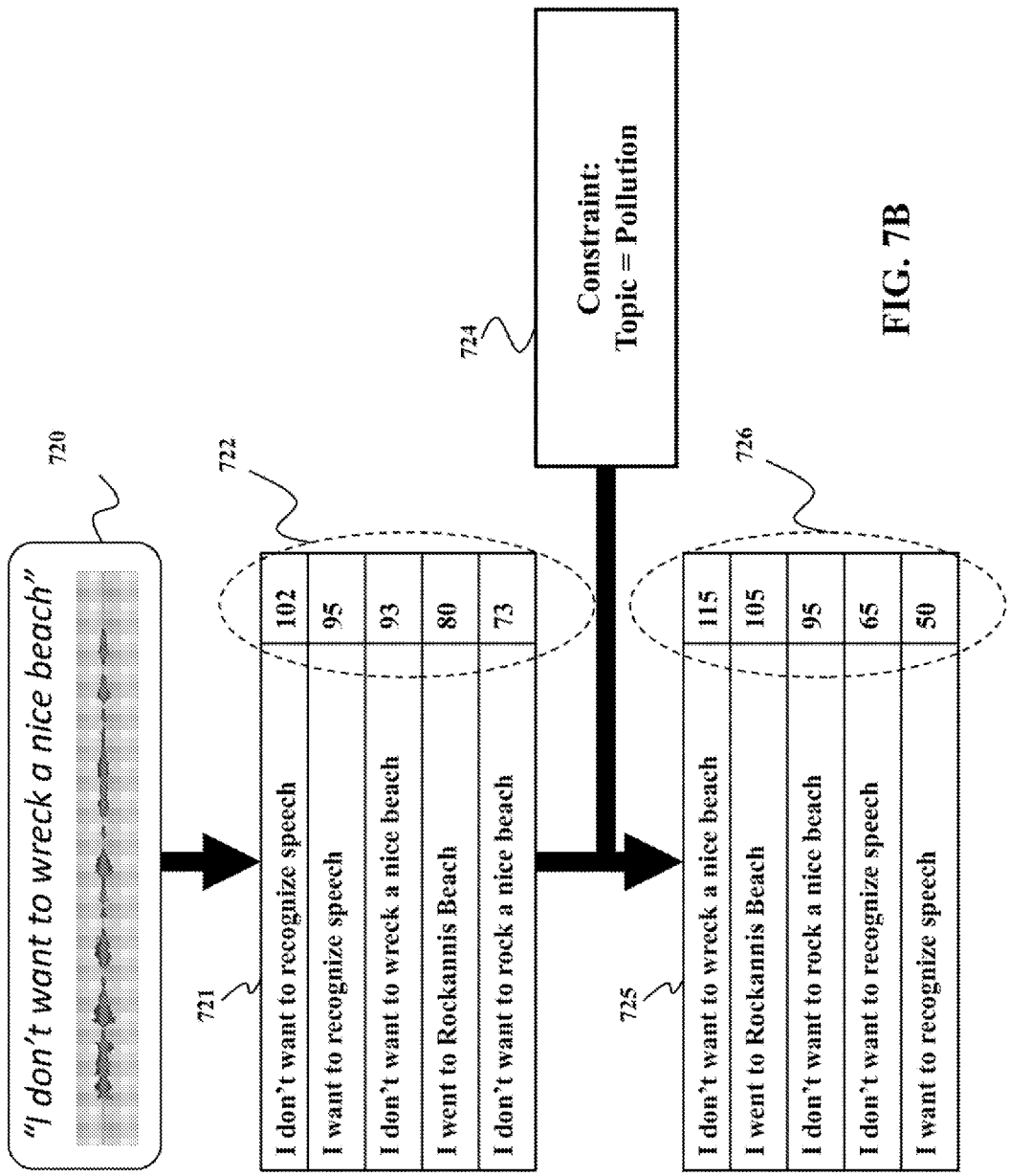

FIG. 7B shows a schematic of an exemplar method for interpreting speech 720 subject to word sequence constraint according to one embodiment of the invention. In this example, the word-sequence constraint includes a constraint 724 on a topic of the speech, i.e., that the speech is about the pollution. The constraint 724 is used to update the score 722 of the entire set of the interpretation 721 to produce an updated set 725 with updated scores 716 of the interpretations.

This exemplar embodiment uses a constrained language model $p_{\theta'_{LM}}(W)$ with parameters $\theta'_{LM}$ that are appropriate for word sequences on the topic of "pollution." Thus the embodiment can update the score function S'(W|X) above using the constrained language model.

Figure 7C:
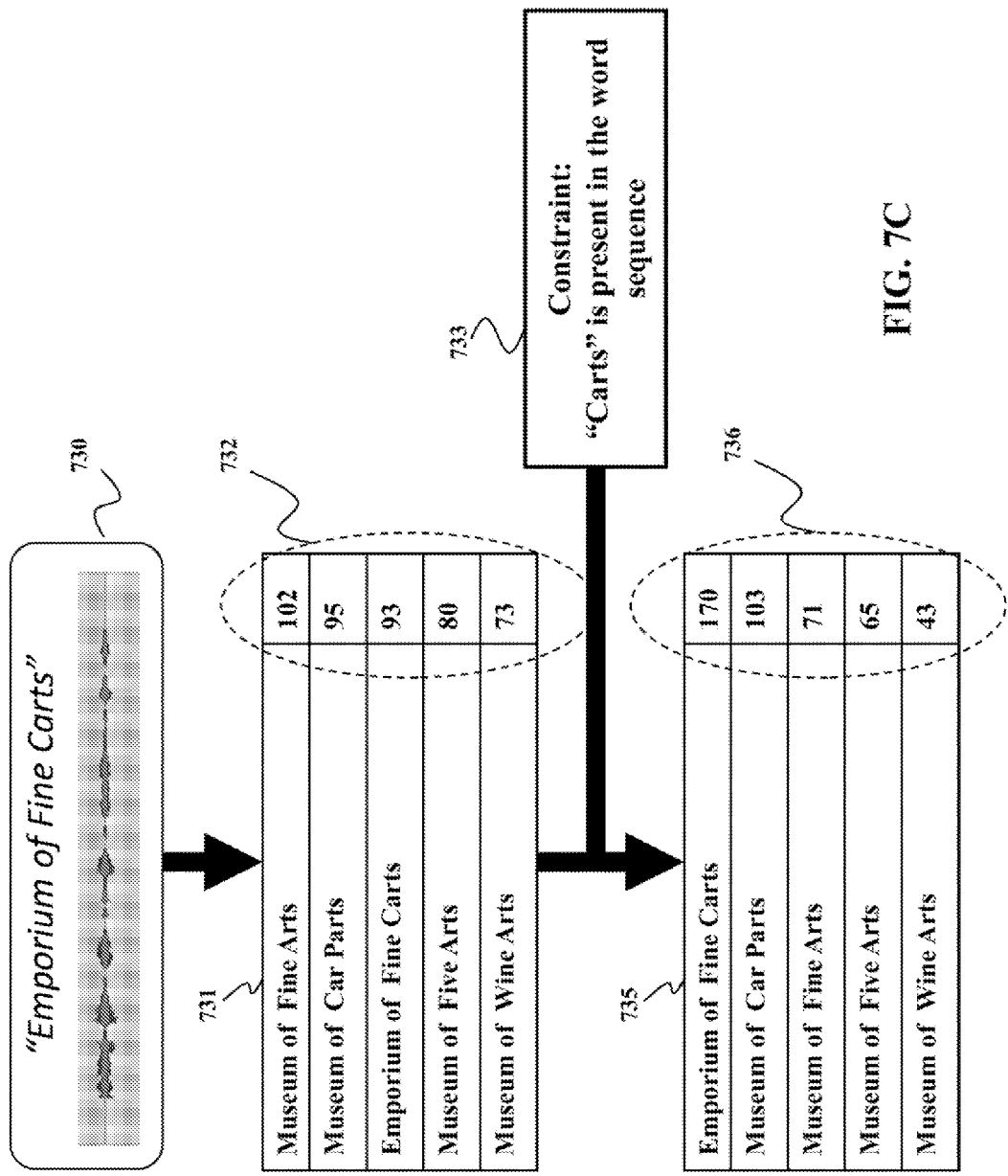

FIG. 7C shows a schematic of an exemplar method for interpreting speech 730 subject to word sequence constraint according to one embodiment of the invention. In this example, the word-sequence constraint includes a constraint 734 on a presence of the specific word "Carts" in the speech. The constraint 734 is used to update the score 732 of the entire set of the interpretation 731 to produce an updated set 735 with updated scores 736 of the interpretations.

For this exemplar embodiment, the general rescoring function $$S'(W \mid X) \propto \max_{R \in S} p(W) p(R \mid W) p(X \mid W, R) f(X, W, R),$$

may be used as described above, with a specific function $f(X,W,R)$ which gives higher weight to sequences that include the word "Carts", such as $$f(X, W, R) = f(W) = \alpha I_{carts \in W} + \beta,$$

and $$I_{carts \in W} = \begin{cases} 1, & carts \in W \\ 0, & otherwise \end{cases}.$$

Other constraint factors and/or indicator functions can also be used.

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, minicomputer, or a tablet computer. Also, a computer may have one or more input: and output systems. These systems can be used, among other things, to present a user interface. Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

The terms "program" or "software" are used herein in a generic sense to refer to any type of computer code or set of computer-executable instructions that can be employed to program a computer or other processor to implement various aspects of the present invention as discussed above.

Computer-executable instructions may be in many forms, such as program modules, executed by one or more computers or other systems. Generally, program modules include routines, programs, objects, components, and data structures that perform particular tasks or implement particular abstract data types. Typically the functionality of the program modules may be combined or distributed as desired in various embodiments.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for recognizing speech including a sequence of words, comprising:
   generating a set of interpretations of the speech using an acoustic model and a language model;
   determining, for each interpretation, a score representing correctness of an interpretation in representing the sequence of words to produce a set of scores;
   determining a constraint for recognizing the speech subject to a word sequence constraint;
   determining a constraint factor indicating a degree of the consistency with the word sequence constraint;
   determining a constrained scoring function based on the constraint factor for updating the set of scores; and
   updating the set of scores using the scoring function; and
   selecting, according to the updated set of scores, a best interpretation from the set of interpretations as the recognized speech, wherein steps of the method are performed by a processor.

2. The method of claim 1, wherein the word sequence constraint includes one or combinations of a number of words in the sequence of words, a presence or absence of a specific word or a sequence of words, a time of utterance of the specific word, an order of at least two specific words in the sequence of words, a connection or separation of the two specific words in the sequence of words, a topic of the speech input.

3. The method of claim 1, wherein the determining the constraint comprises:
   communicating a subset of the set of interpretations to a user;
   receiving the word sequence constraint in response to the communicating;
   determining a type of the constraint based on the word sequence constraint; and
   determining the constraint based on the type.

4. The method of claim 3, wherein the type is a language type and the determining the constraint comprises:
   updating the language model based on the word sequence constraint.

5. The method of claim 4, wherein the word sequence constraint is a topic of the speech.

6. The method of claim 3, wherein the type is an acoustic type and the determining the constraint comprises:
   updating the acoustic model based on the word sequence constraint.

7. The method of claim 6, wherein the acoustic model includes an alignment between words in the speech and acoustic features of the acoustic model.

8. The method of claim 7, the constraint includes that there is only one word within a particular time region.

9. The method of claim 3, wherein the type is a context type and the determining the constraint comprises:
   determining a scoring function testing presence or absence of a specific word in each interpretation.

10. The method of claim 9, wherein the scoring function tests for presence of the specific word, further comprising:
    determining a direction of the speech based on the language model; and
    updating the scoring function with a test for presence of words preceding and following the specific word according to the direction of the speech.

11. The method of claim 1, wherein the scoring function S'(W|X) is $$S'(W \mid X) \propto \max_{R \in S} p(W)p(R \mid W)p(X \mid W, R)f(X, W, R),$$

wherein $\propto$ denotes proportionality, $W = (w_1)_{i=1}^N$ is a sequence of N words $w_1, w_2, \ldots, w_N$ in the interpretation, and $w_1$ is a word hypothesized in a position i, $X = \{x_j\}_{j=1}^T$, denotes acoustic features of the acoustic model, where $x_j$ is an jth vector of the acoustic features of the speech input and T is the number of acoustic feature vectors, a function $p(.|..)$ is a probability, S is a set of possible alignments, $R = \{r_i\}_{i=1}^N$ is a set of hypothesized time regions of the speech for each hypothesized word, such that $r_i$ is the position hypothesized for word $w_1$ and $f(X,W,R)$ is a constraint factor outputting a number indicating a degree of consistency with the constraint for one or more of an acoustic sequence, a word sequence, and an alignment.

12. The method of claim 11, further comprising:
    determining an indicator function using the word sequence constraint; and
    determining the constraint factor as a linear function of the indicator function with weight parameters that determine a degree of constraint satisfaction.

13. The method of claim 1, wherein the constraint includes metadata of the sequence of words.

14. The method of claim 1, further comprising:
    determining the interpretation with the largest score as the recognized speech.

15. A method for recognizing speech of a user, comprising:
    recognizing the speech to generate a set of interpretations associated with a corresponding set of scores representing correctness of each interpretation in representing the speech; and
    updating iteratively the set of scores subject to at least one constraint, such that, for each iteration, a score of each interpretation is increased if the interpretation is consistent with the constraint, and is decreased if the interpretation is inconsistent with the constraint; and
    selecting, according to the updated set of scores, an interpretation from the set of interpretations as the recognized speech, wherein steps of the method are performed by a processor, wherein the updating comprises:
    communicating a subset of the set of interpretations to a user;
    receiving a word sequence constraint in response to the communicating;

determining a type of the constraint based on the word sequence constraint, wherein the type is a context type;

determining a scoring function testing presence or absence of a specific word in each interpretation;

determining a direction of the speech based on a language model;

updating the scoring function with a test for presence of words preceding and following the specific word according to the direction of the speech; and determining the constraint based on the type.

16. A system for recognizing speech, comprising:

a processor implementing a speech recognition module and an error correction module, wherein the speech recognition module generates a set of interpretations of the speech input using an acoustic model and a language model, determines, for each interpretation, a score representing correctness of an interpretation in representing the speech and selects, according to the score of each interpretation, a best interpretation from the set of interpretation as the recognized speech; and wherein the error correction module determines a constraint for recognizing the speech, and updates the score of each interpretation based on a consistency of the interpretation with the constraint, wherein the constraint is determined by:

communicating a subset of the set of interpretations to a user;

receiving a word sequence constraint in response to the communicating;

determining a type of the constraint based on the word sequence constraint, wherein the type is a context type;

determining a scoring function testing presence or absence of a specific word in each interpretation;

determining a direction of the speech based on a language model;

updating the scoring function with a test for presence of words preceding and following the specific word according to the direction of the speech; and determining the constraint based on the type.

17. The system of claim 16, further comprising:

an audio interface for receiving the speech representing a sequence of words;

a controller for communicating at least a subset of the set of interpretations to the user and for receiving a word sequence constraint from the user, wherein the processor determines the constraint based on the word sequence constraint.

18. The system of claim 16, wherein the system for recognizing the speech is embedded in an instrumental panel of a vehicle.

* * * * *